(12) United States Patent
Al Najjar (10) Patent No.: US 11,412,883 B2
(45) Date of Patent: Aug. 16, 2022

(54) COFFEE MACHINE

(71) Applicant: Research, Investment & Development S.A.L. (Holding), Beirut (LB)

(72) Inventor: George Michel Al Najjar, Beirut (LB)

(73) Assignee: Research, Investment & Development S.A.L. (Holding), Beirut (LB)

( * ) Notice: Subject to any disclaimer, the term of this patent is extended or adjusted under 35 U.S.C. 154(b) by 451 days.

(21) Appl. No.: 16/451,316

(22) Filed: Jun. 25, 2019

(65) Prior Publication Data

US 2020/0015618 A1   Jan. 16, 2020

(30) Foreign Application Priority Data

Jul. 10, 2018   (EP) ...................... 18182649

(51) Int. Cl.
  *A47J 31/06*   (2006.01)
  *A47J 31/10*   (2006.01)
  *A47J 31/44*   (2006.01)

(52) U.S. Cl.
  CPC ....... *A47J 31/0605* (2013.01); *A47J 31/0615* (2013.01); *A47J 31/10* (2013.01); *A47J 31/4403* (2013.01)

(58) Field of Classification Search
  CPC ..... A47J 31/0605; A47J 31/0615; A47J 31/18
  USPC ........................................ 99/299
  See application file for complete search history.

(56) References Cited

U.S. PATENT DOCUMENTS 3,941,042 A * 3/1976 Wells ............... A47J 31/057
                                                   99/289 R
7,073,428 B2 * 7/2006 Chung ............ A47J 31/0615
                                                   99/283

FOREIGN PATENT DOCUMENTS

WO       WO-0176430 A1 * 10/2001   ............. A47J 31/18

* cited by examiner

*Primary Examiner* — Reginald Alexander
(74) *Attorney, Agent, or Firm* — Bay State IP, LLC (57) ABSTRACT

Coffee machine (10) comprising a machine frame (12), a pot (14) which has a bottom wall (16), a circumferential side wall (18), an inlet opening (20) provided in an upper portion of the pot (14), and an outlet opening (22) provided in a lower and outer portion of the pot (14), wherein the pot (14) is mounted to the machine frame (12) in a manner so as to be pivotable relative to the machine frame (12) about a horizontal pivot axis (24) between a coffee preparation position and a coffee distribution position, in which the outlet opening (22) is positioned at a lower vertical level than in the coffee preparation position, a valve mechanism (26) including a closure element (28), wherein the closure element (28) and the pot (14) are movable relative to each other between a closed position, in which the closure element (28) closes the outlet opening (22).

20 Claims, 8 Drawing Sheets

COFFEE MACHINE

CROSS REFERENCE TO RELATED APPLICATION

This application claims the benefit of and takes priority from European Union Patent Application No. EP18182649 filed on Jul. 10, 2018 the contents of which are herein incorporated by reference.

BACKGROUND OF THE INVENTION

Field of the Invention

The invention is related to a coffee machine, e.g. to a coffee machine for preparing Lebanese-type coffee which comprises a slurry of water and coffee powder.

Description of the Related Art

E.g. from WO 2017/076820 A1 a corresponding coffee machine is known, which has a coffee preparation pot having a bottom wall inclined toward an outlet opening to improve distribution characteristics of the coffee machine.

SUMMARY OF THE INVENTION

It is an object of the invention to provide a coffee machine allowing preparation of Lebanese-type or traditional (e.g. Greek-type, Cypriot-type or Turkish-type) coffee, which has good distribution characteristics, incl. easy handling of coffee distribution, and which provides less restrictions regarding a pot shape.

The invention provides a coffee machine comprising a machine frame, a pot which has a bottom wall, a circumferential side wall, an inlet opening provided in an upper portion of the pot, and an outlet opening provided in a lower and outer portion of the pot, wherein the pot is mounted to the machine frame in a manner so as to be pivotable relative to the machine frame about a horizontal pivot axis between a coffee preparation position and a coffee distribution position, in which the outlet opening is positioned at a lower vertical level than in the coffee preparation position, a valve mechanism including a closure element, wherein the closure element and the pot are moveable relative to each other between a closed position, in which the closure element closes the outlet opening, and an opened position, in which the closure element releases the outlet opening, a pivot device (which, e.g., is installed on the machine frame) which is connected to the pot, and by operation of which the pot can be caused to pivot between the coffee preparation and coffee distribution positions thereof, and an operating mechanism (which, e.g., is installed on the machine frame and) which is configured to operate the valve mechanism to move the pot and the closure element relative to each other between the closed position and the opened position.

Regarding the aspect that the closure and the pot are movable relative to each other, this aspect in this application includes that the closure element is movable/moved relative to the pot (e.g. without moving the pot), and/or that the closure element and the pot are moveable/moved (e.g. they are simultaneously moved), and/or that the pot is movable/moved relative to the closure element (e.g. without moving the closure element).

The operating mechanism may be configured in a manner so that, when the pot is being pivoted from the coffee distribution position to the coffee preparation position, the operating mechanism simultaneously (e.g. simultaneously and automatically) operates the valve mechanism to move the pot and the closure element relative to each other from the closed position to the opened position, and, when the pot is being pivoted from the coffee distribution position to the coffee preparation position, the operating mechanism simultaneously (e.g. simultaneously and automatically) operates the valve mechanism to move the pot and the closure element relative to each other from the opened position to the closed position. The operating mechanism may be configured in a manner so that, when the pot is in the coffee distribution position, the operating mechanism can operate the valve mechanism to move the pot and the closure element relative to each other between the closed position and the opened position. Further, the operating mechanism may be provided such as to or may be operated/operable to operate the valve mechanism multiple times, so as to move the pot and the closure element relative to each other between the closed position and the opened position multiple times (when the pot is in the coffee distribution position).

Since the pot is pivoted to its coffee distribution position, in which the outlet opening is positioned at a lower vertical level than in the coffee preparation position, the liquid pressure in the area of the outlet opening can be increased thereby providing for a reliable distribution of the prepared coffee and allowing to substantially fully empty the pot. In this respect, the pot may be provided with a flat and non-inclined bottom wall which, when in the coffee preparation position, extends horizontally. (That is, in this case, e.g., a central axis of the pot, which is circumscribed by the side wall, extends at an angle of 90° (+/− tolerances) to the bottom wall). In addition, the operating mechanism allows an automatic release of the outlet opening just by operating the pivoting of the pot, thereby facilitating the handling/operation of the coffee machine. In addition, the operating mechanism provides for a reliable opening/releasing and closing of the outlet opening.

The pivot device may be a manually operable device, provided, for example, by a handle attached to the pot and allowing to directly pivot the pot, wherein the pivoting range may be restricted by stoppers to prevent over-pivoting. The pivot device may alternatively be provided in a motorized manner, by, e.g., having an electrical motor (e.g. an actuator) connected to the pot, e.g. via a mechanical coupling or a gear transmission, or by having a solenoid connected to the pot via, e.g., a linkage, to thereby allow pivoting of the pot by merely operating the electrical motor or the solenoid.

In order to allow to vertically lower the outlet opening in connection with pivoting the pot from the coffee preparation position to the coffee distribution position thereof, the pivot axis, when seen in top view of the pot, e.g., extends transverse to a diametrical line of the pot, on which the outlet opening is located, so that the outlet opening can be lowered by pivoting the pot about the pivot axis. This allows to position the outlet opening at a lowermost vertical position of the pot (in the coffee distribution position) compared to other pot portions. In case the pot, in top view, has a non-circular extending side wall/non-circular shape, the term "diametrical line" may relate to a circumcircle of the pot shape in top view.

According to an embodiment, the operating mechanism may be formed by the pivot device, or by parts of the pivot device. In this case, e.g., the closure element may be fixedly attached to the machine frame, and the pot may form part of the valve mechanism operated/operable by the pivot device which then simultaneously acts as operating mechanism in a manner that, by pivoting the pot to its coffee distribution position, the pot, with its outlet opening, is/will be pivoted away from the closure element, whereby the outlet opening is opened, and vice versa.

According to an embodiment, the closure element may be mounted to the pot so as to be movable relative to the pot between the closed position, in which the closure element closes the outlet opening, and the opened position, in which the closure element releases the outlet opening, and the operating mechanism may be a moving mechanism which is connected to the closure element so as to move the closure element, when the pot is pivoted from the coffee preparation position to the coffee distribution position, from the closed position to the opened position, and, when the pot is pivoted from the coffee distribution position to the coffee preparation position, from the opened position to the closed position.

The operating mechanism may comprise a linkage and/or a cable connection, via which the closure element is connected to the machine frame in a manner that, when the closure element is pivoted together with the pivoting motion of the pot, caused by the pivot device, from the coffee preparation position to the coffee distribution position thereof, the corresponding pivoting motion of the closure element causes the linkage and/or the cable connection to create an operating force acting between the closure element and the machine frame and operating the closure element in a manner so as to be moved from the closed position to the opened position (thereof).

For providing a/the restoring force for restoring the closure element from the opened position to the closed position thereof, the operating mechanism may comprise an elastic element (e.g. a spring) installed between the closure element and the pot and biasing the closure element towards its closed position. In addition (to this) or alternatively, the linkage may be configured such that the closure element is forceably moved to its closed position by the linkage, wherein an elastic element (e.g. a spring) may be provided between elements of linkage and/or between the linkage and the machine frame to bias the linkage towards a configuration, in which the closure element is in its closed position.

Further, the closure element may be mounted to the pot so as to be rotatable relative to the pot about a rotation axis between the closed position, in which the closure element closes the outlet opening, and the opened position, in which the closure element releases the outlet opening, and the rotation axis may be fixedly arranged relative to the pot so as to be moved relative to the machine frame together with the pivoting motion of the pot, and the moving mechanism can be a rotation mechanism which includes a linkage which is linked to the closure element via a first joint and which is linked to the machine frame via a second joint so that, when the pot is pivoted from the coffee preparation position to the coffee distribution position, the distance between the rotation axis (which is (pivotally) moved about the pivot axis together with the pivoting motion of the pot) and the second joint increases whereby the linkage causes the closure element to rotate from the closed position to the opened position, and, when the pot is pivoted from the coffee distribution position to the coffee preparation position, the distance between the rotation axis (which is (pivotally) moved about the pivot axis together with the pivoting motion of the pot) and the second joint decreases whereby the linkage causes the closure element to correspondingly rotate from the opened position to the closed position.

The linkage may, e.g., comprise a first link arm linked on one end portion thereof to the machine frame via the second joint, and a second link arm linked on end portion thereof to the closure element via the first joint, wherein the first and second link arms are linked to each other on their other end portions via a third joint. The use of a two arm linkage may increase flexibility thereof and may increase the possible distance the rotation axis can move away from the second joint, thereby allowing corresponding increased rotation/rotational motion ranges for the closure element, including, e.g., allowing a full release of the outlet opening in the coffee distribution position.

The pivot device may, e.g., comprise an elastic element (e.g. a spring, a coil spring), which acts against the pot so as to bias the pot to assume its coffee preparation position. The use of such an elastic element may be of benefit in case the pivot device is provided as manually operable device, since the elastic element then automatically restores the pot into its coffee preparation position. The coil spring may be of benefit since it may be easily and reliably installed on the linkage, for example on the first link arm. However, the elastic element may also be an elastomeric spring or any other appropriate spring type.

The elastic element may, e.g., be a compression spring which is compressed when the pot is pivoted from the coffee preparation position to the coffee distribution position, wherein the compression spring is supported, on the one hand, against the pot and, on the other hand, against the linkage, optionally against the first link arm, so that a corresponding elastic force (e.g. spring force) acts on the pot and acts on the linkage, optionally on the first link arm, via which linkage, optionally via which first link arm, the corresponding counter-force of said compression force is transferred to the machine frame via the second joint. The afore-mentioned structure may be of benefit in that the elastic element may be arranged on the linkage, e.g. on the first link arm, whereby a direct connection between elastic element and frame can be omitted. This may allow a non-complex, but nevertheless reliable restoring structure.

The pivot device may, e.g., comprise a pushing element which is movably installed to the machine frame and which can be operated to push against a push receiving portion of the pot, which push receiving portion, when seen in a top view of the pot, is offset from the pivot axis in a direction towards the outlet opening, wherein, optionally, the pushing element is a pushing rod which can be pushed, with a rod end thereof, against the push receiving portion. Such a structure may be highly flexible with regard to the operation of the pushing element, since such a pushing element may be easily provided to be manually and/or motor driven, e.g. via an electric motor or a solenoid.

The closure element may, e.g., comprise an elbow element (e.g. a rigid elbow element) having a first leg and a second leg which are connected to each other on a base portion of the elbow element, and a plug attached to the first leg, optionally to a free end portion of the first leg, wherein the first joint is connected to the second leg, optionally to a free end portion of the second leg, and wherein, further optionally, the rotation axis is located adjacent to or in the base portion. The elbow structure of the closure element may allow an increased rotational motion range for the plug, thereby allowing a reliable closing of the outlet opening in the coffee preparation position as well as a wide, e.g. complete, opening of the outlet opening in the coffee distribution position.

The operating mechanism may comprise an electric motor connected to the closure element to move the closure element between the closed position and the opened position thereof, a sensor for determining the pivoting position of the pot, and a controller connected to the sensor for receiving sensor signals corresponding to the determined pivoting position of the pot and connected to the electric motor to control the motor in accordance with the sensor signals. The controller may control the electric motor such that the closure element is moved to the closed position, when the pot is determined to be in its coffee preparation position, and that the closure element is moved to the opened position, when the pot is determined to be in its coffee distribution position.

The operating mechanism may further comprise a user interface (e.g. a switch) connected to the controller, by operation of which user interface the operating mechanism can be operated. The operating mechanism may also be operated by a combination of the sensor signals and the operation of the user interface. The user interface may also allow a user to program the controller. The controller may, e.g., be programmed/programmable to execute a predetermined coffee dispensing routine (e.g. an automated coffee dispensing routine) including a predetermined (e.g. automated) sequence of controlling the electric motor (e.g., multiple times) so as to move the closure element between the opened position and the closed position (e.g., multiple times).

The pivot device may comprise an actuator and a mechanical coupling, wherein the actuator is coupled to the controller, and wherein the actuator is coupled to the pot by the mechanical coupling. The controller may then be programmed/programmable to operate the actuator so as to move the pot between the coffee preparation position and the coffee distribution position. Further, the actuator may cause/may be able to cause the pivoting motion of the pot. Further, the controller may, e.g., be programmed/programmable to execute a predetermined (e.g. automated) coffee dispensing routine including a sequence of operating the actuator (e.g., multiple times) so as to move the pot between the coffee preparation position and the coffee distribution position (e.g., multiple times) and of controlling the electric motor (e.g., multiple times) so as to move the closure element between the closed position and the opened position (e.g., multiple times).

The bottom wall may, e.g., have a plate shape, optionally a flat plate shape, and may extend horizontally when the pot is in the coffee preparation position and may be inclined relative to the horizontal plane when the pot is in the coffee distribution position. This structure of the pot may be of benefit in that the pot may be provided in shape having reduced complexity. Further, this structure of the pot may be of benefit in that boiling of the coffee (e.g. the quality of the coffee) may be improved, since it may allow for a more homogeneous heat distribution in the bottom wall and, thus, within the coffee to be prepared. Therefore, this structure may prevent over-boiling of the coffee.

The coffee machine may, e.g., further include an electrical heating device which is arranged on the bottom wall on an outside thereof, wherein the heating device is fixedly attached to the pot so as to be moved in connection with the pivoting of the pot. The heating structure may be a conventional resistor heating device or may be a film heater device or may be an induction heating coil. This structure may be of benefit in that the heating device may be easily arranged on the bottom wall, and nevertheless a reliable heating of the coffee may be achieved.

The coffee machine may, e.g., further comprise a funnel which is fixedly attached to the machine frame and which has a funnel inlet arranged proximal to the outlet opening such as to receive prepared coffee via the outlet opening when the pot is in the coffee distribution position, and a funnel outlet arranged below the funnel inlet, wherein, optionally, the coffee machine further comprises a cup positioning station, e.g. in form of a platform, which may be fixedly attached to the machine frame and which is located in a vertical distance below the funnel outlet and on which a cup can be positioned to receive the coffee distributed/dispensed via the funnel outlet. Because of the fixed/stationary arrangement (that is stationary relative to the machine frame) of the funnel, this structure may lead to a further reliable distribution of the coffee into a coffee cup.

Although the coffee machine may be provided such that coffee powder is manually added to the pot, the coffee machine may, e.g., further comprise a coffee powder supply device connected to the inlet opening of the pot and configured to (automatically) supply coffee powder into the pot via the inlet opening.

Water may be manually introduced into the pot, or the coffee machine may be further provided with a water supply device having a water reservoir for containing water, a water pump and a water line which fluidly connects, via the water pump, the water reservoir with the inlet opening of the pot.

The push receiving portion may, e.g., be formed by a protrusion which is formed on an upper portion of the side wall of the pot and which laterally (and radially outwardly) protrudes away from the side wall. This configuration may require only a minor additional feature to the pot, but may provide for a reliable push receiving portion which may be easily accessible from a top side of the coffee machine.

The protrusion may, e.g., have a through hole, through which the linkage, optionally the first link arm, extends, wherein the linkage, optionally the first link arm, is provided with an axial shoulder which is arranged opposite to the protrusion and in a distance from the protrusion in a direction away from the second joint and which faces the protrusion, wherein the elastic element is arranged between and supported by the protrusion and the axial shoulder to thereby transfer the elastic force to the pot via the protrusion and to the linkage, optionally to the first link arm, via the axial shoulder. This structure may have the benefit of allowing a compact construction.

In the coffee preparation position, the second leg and the second link arm, on one side thereof, together may enclose an angle in a range of 80-90°, optionally 85-90°, further optionally of at least substantially 90° (=e.g., 90°+/−1° or +/−2°). That is, in the coffee preparation position a line, which extends through the rotation axis and the first joint, and a line, which extends through the first joint and the third joint, enclose the above mentioned angle ranges. This structure may be of benefit in that the plug may be pressed against the outlet opening with increased pressure thereby providing for a further reliable sealing of the outlet opening in the coffee preparation position. In the coffee distribution position, the second leg and the second link arm, on said side thereof, may, e.g., enclose an angle of >90° to 180°, optionally >120° to 180°.

The pivot axis may, e.g., be located in the proximity of the upper portion of the pot, optionally in the proximity of the upper portion of the pot and below an upper edge of the side wall of the pot. This structure may be of benefit in that the pot will not be laterally deflected in an extensive manner when being pivoted from its coffee preparation position to its coffee distribution position, whereby the coffee machine can be kept compact.

The valve mechanism (and, e.g., the operating mechanism) may, e.g., be located outside of the pot, and the valve mechanism (and, e.g., the operating mechanism) may optionally be mounted to an outer portion (e.g. the bottom wall and/or the circumferential side wall) of the pot. This location/mounting position of the valve mechanism (and, e.g., the operating mechanism) may be of benefit in that maintaining/cleaning the coffee machine (e.g., the pot, the valve mechanism and/or the operating mechanism) can be facilitated (e.g. simplified).

BRIEF DESCRIPTION OF THE DRAWINGS

In the following the invention will be described on the basis of certain embodiments in connection with the attached drawings. In the figures same reference signs will be used for same parts. The invention shall, however, not be restricted to these embodiments, and the scope of the invention shall merely be defined by the subject matter of claims as attached thereto and by equivalents thereof.

DETAILED DESCRIPTION OF THE SEVERAL EMBODIMENTS

Figure 1:
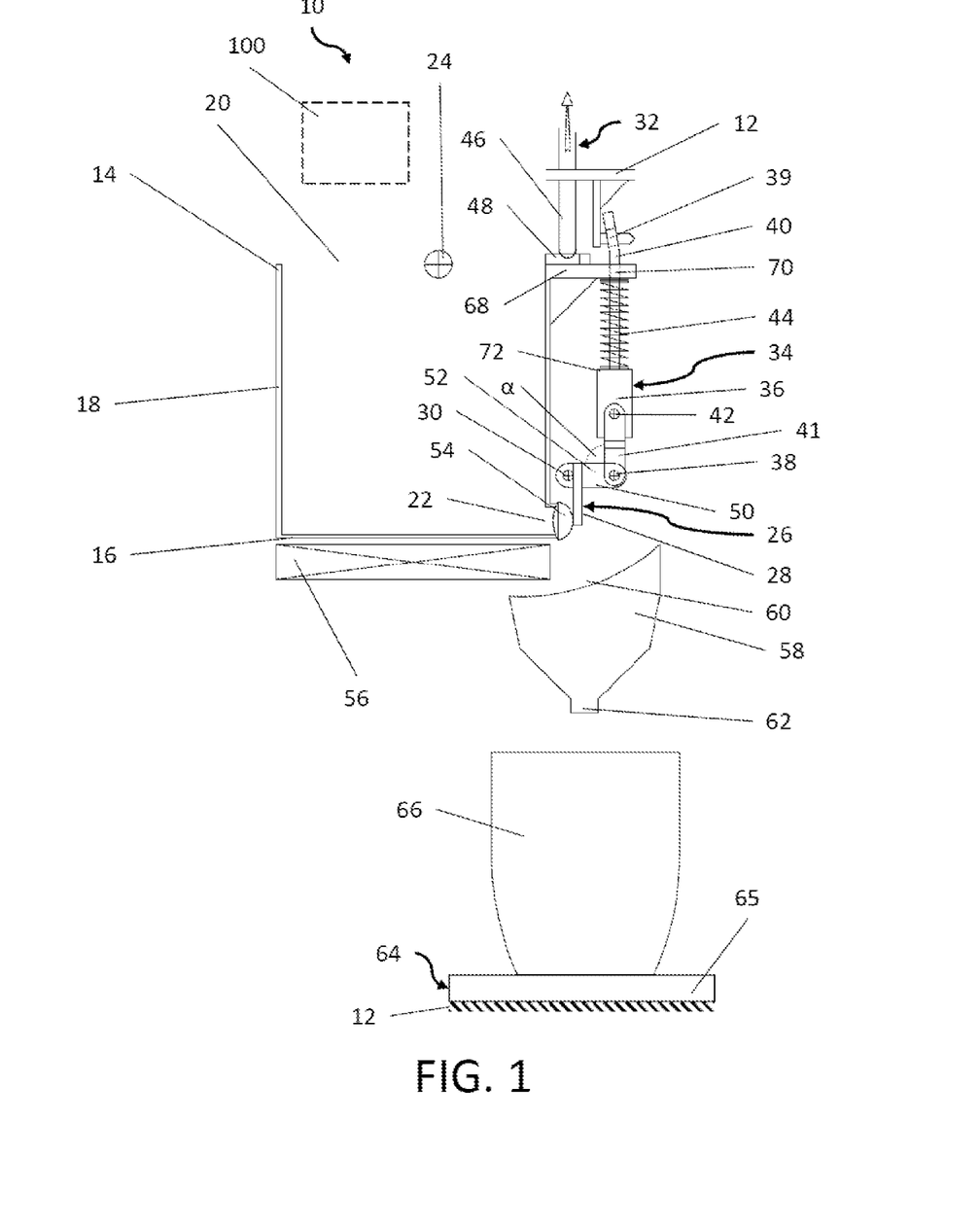
FIG. 1 is a schematic and partly cut side view illustrating a coffee machine in a coffee preparation position according to an embodiment of the invention.
Figure 2:
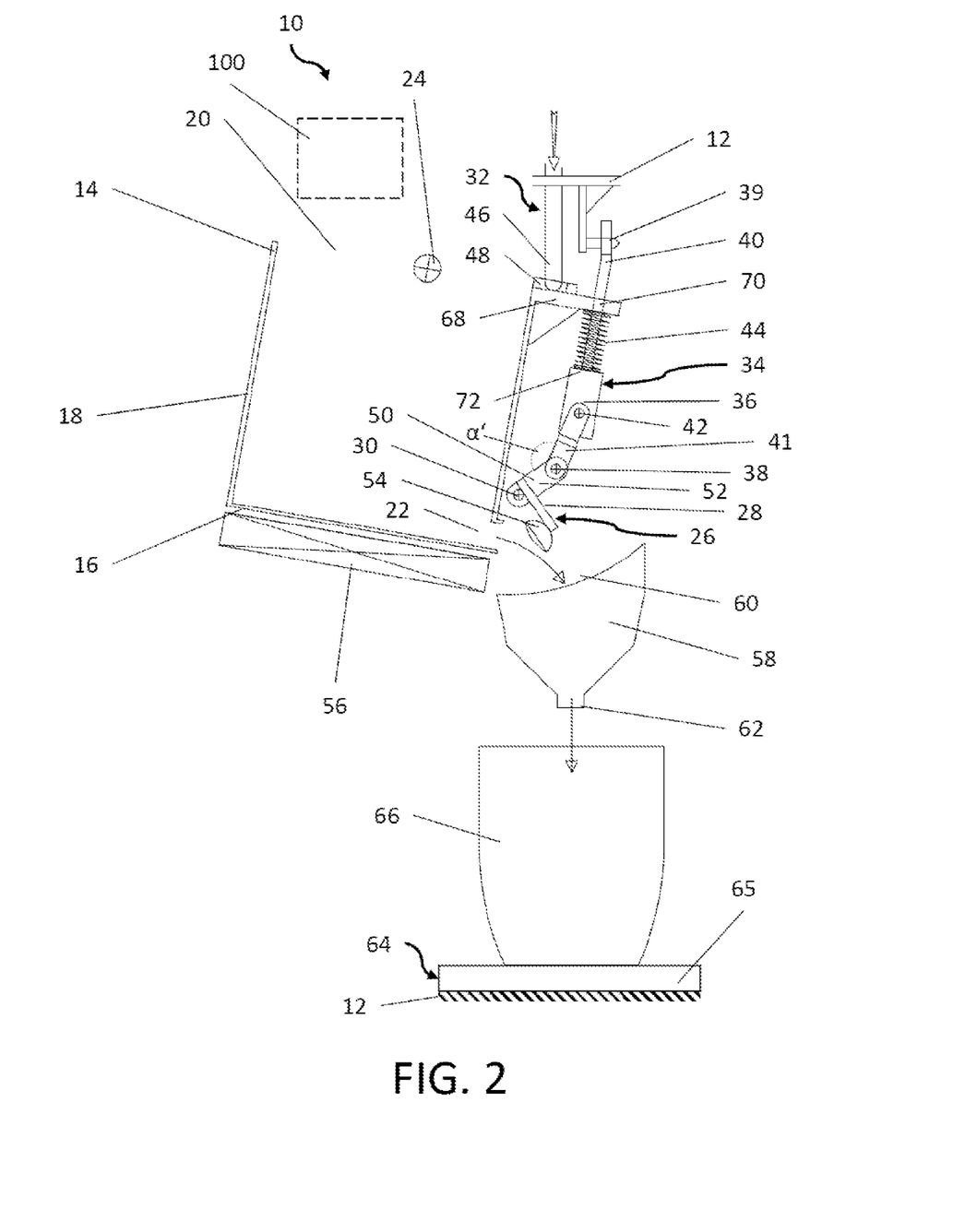
FIG. 2 is a schematic and partly cut side view illustrating a coffee machine in a coffee distribution position according to the embodiment of the invention shown in FIG. 1.

Referring to FIG. 1 and FIG. 2, a coffee machine 10 according to an embodiment of the invention comprises a machine frame 12, a pot 14 which has a bottom wall 16, a circumferential side wall 18, an inlet opening 20 provided in an upper portion of the pot 14, and an outlet opening 22 provided in a lower and outer portion of the pot 14, wherein the pot 14 is mounted to the machine frame 12 in a manner so as to be pivotable relative to the machine frame 12 about a horizontal pivot axis 24, which, when seen in top view of the pot 14, extends transverse to a diametrical line of the pot 14, on which the outlet opening 22 is located, between a coffee preparation position (see FIG. 1) and a coffee distribution position (see FIG. 2), in which the outlet opening 22 is positioned at a lower vertical level than in the coffee preparation position, a valve mechanism 26 including a closure element 28 which is mounted to the pot 14 so as to be rotatable relative to the pot 14 about a rotation axis 30, which extends parallel to the pivot axis 24, between a closed position (see FIG. 1), in which the closure element 28 closes the outlet opening 22, and an opened position (see FIG. 2), in which the closure element 28 releases the outlet opening 22, wherein the rotation axis 30 is fixedly arranged relative to the pot 14 so as to be moved relative to the machine frame 12 together with the pivoting motion of the pot 14, a pivot device 32 which is installed on the machine frame 12 and connected to the pot 14 and by operation of which the pot 14 can be caused to pivot between the coffee preparation and coffee distribution positions thereof, and an operating mechanism 34 which in this case is formed as a moving mechanism in form of a rotation mechanism and which includes a linkage 36 which is linked to the closure element 28 via a first joint 38 and which is linked to the machine frame 12 via a second joint 39 so that, when the pot 14 is pivoted from the coffee preparation position to the coffee distribution position, the distance between the rotation axis 30 (which is (pivotally) moved about the pivot axis 24 together with the pivoting motion of the pot 14) and the second joint 39 increases whereby the linkage 36 causes the closure element 28 to rotate from the closed position to the opened position, and, when the pot 14 is pivoted from the coffee distribution position to the coffee preparation position, the distance between the rotation axis 30 (which is (pivotally) moved about the pivot axis 24 together with the pivoting motion of the pot 14) and the second joint 39 decreases whereby the linkage 36 causes the closure element 28 to correspondingly rotate from the opened position to the closed position.

The linkage 36 comprises a first link arm 40 linked on one end portion thereof to the machine frame 12 via the second joint 39, and a second link arm 41 linked on end portion thereof to the closure element 28 via the first joint 38, wherein the first and second link arms 40, 41 are linked to each other on their other end portions via a third joint 42.

The pivot device 32 comprises an elastic element (e.g. a spring 44, a coil spring), which acts against the pot 14 so as to bias the pot 14 to assume its coffee preparation position.

The elastic element 44 is a compression spring which is compressed when the pot 14 is pivoted from the coffee preparation position to the coffee distribution position, wherein the compression spring is supported, on the one hand, against the pot 14 and, on the other hand, against the first link arm 40 of the linkage 36 so that a corresponding elastic force (e.g. spring force) acts on the pot 14 and acts on the first link arm 40 of the linkage 36, via which first link arm 40 the corresponding counter-force of said compression force is transferred to the machine frame 12 via the second joint 39.

The pivot device 32 comprises a pushing element 46 which is movably installed to the machine frame 12 (e.g. movable in an up and down direction, when seen in the side view of the pot 14) and which can be operated to push against a push receiving portion 48 of the pot 14, which push receiving portion 48, when seen in a top view of the pot 14, is offset from the pivot axis 24 in a direction towards the outlet opening 22, wherein the pushing element 46 is a pushing rod which can be pushed/which pushes, with a rod end thereof, against the push receiving portion 48.

Figure 3:
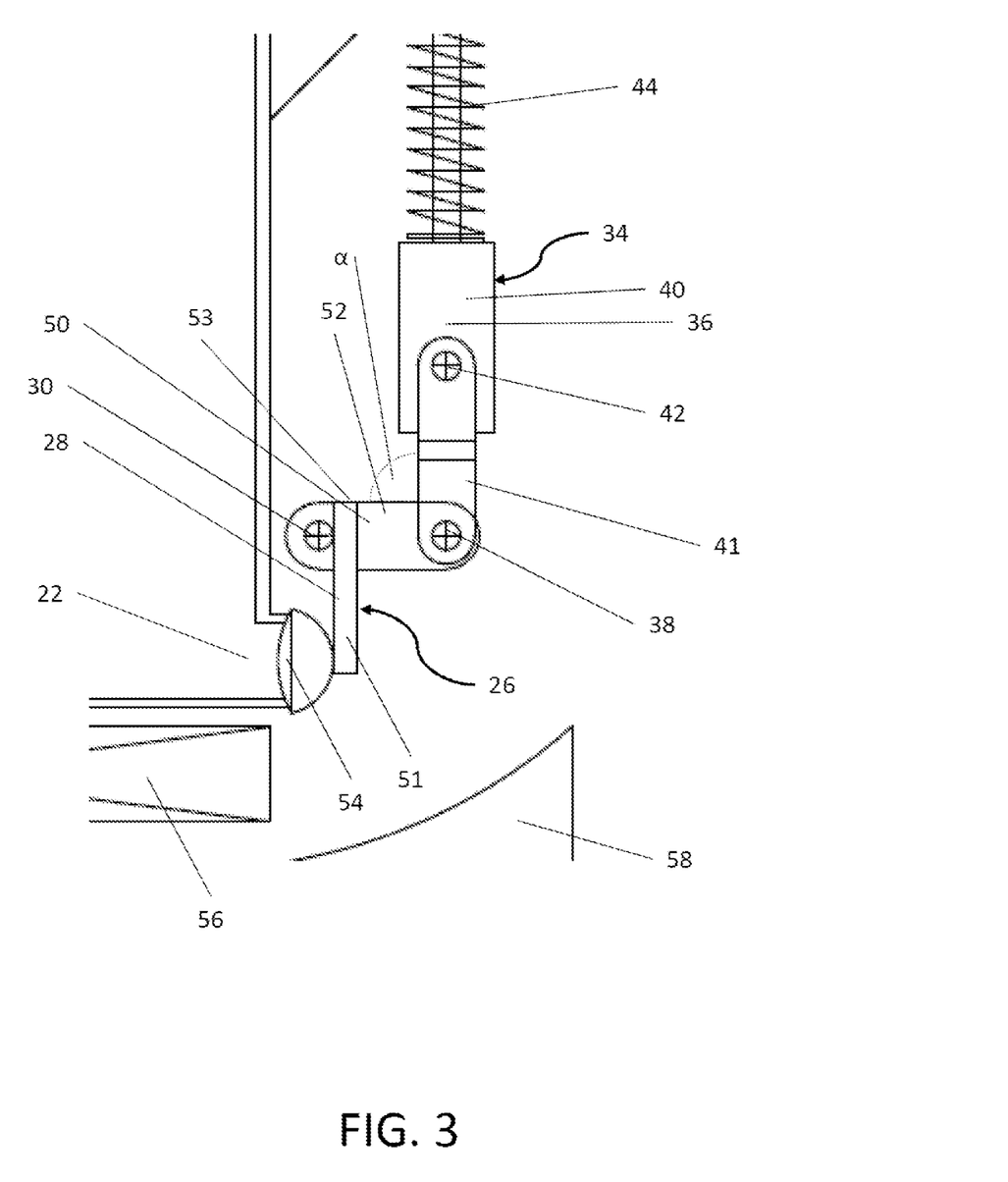
FIG. 3 is an enlarged schematic and partly cut side view illustrating a part of a coffee machine in a coffee preparation position according to the embodiment of the invention shown in FIG. 1.

The closure element 28 comprises a (rigid) elbow element 50 having a first leg 51 and a second leg 52 which are (rigidly) connected to each other on a base portion 53 of the elbow element 50, and a plug 54 attached to the first leg 51, in this case to a free end portion of the first leg 51, wherein the first joint 38 is connected to the second leg 52, in this case to a free end portion of the second leg 52, and wherein the rotation axis 30 is located adjacent to the base portion 53 (see FIG. 3).

The push receiving portion 48 is formed by a protrusion 68 which is formed on the upper portion of the side wall 18 of the pot 14 and which laterally protrudes away (that is radially and outwardly) from the side wall 18.

The protrusion 68 has a through hole 70, through which the first link arm 40 of the linkage 36 extends, wherein the first link arm 40 is provided with an axial shoulder 72 which is arranged opposite to the protrusion 68 and in a distance from the protrusion 68 in a direction towards the away from the second joint 39 and which faces the protrusion 68, wherein the elastic element 44 is arranged between and supported by the protrusion 68 and the axial shoulder 72 to thereby transfer the elastic force to the pot 14 via the protrusion 68 and to the first link arm 41 via the axial shoulder 72.

In the coffee preparation position (see FIG. 1), the second leg 52 and the second link arm 41, on one side thereof, together enclose an angle $\alpha$ in a range of at least substantially 90°. In the coffee distribution position (see FIG. 2), the second leg 52 and the second link arm 41, on said side thereof, together enclose an angle $\alpha'$ of >120° and <180°.

In the following, a coffee machine 10 according to another embodiment is described based on FIG. 4. The embodiment of FIG. 4 comprises many features of the embodiments of FIGS. 1 and 2, so that, in the following merely the differences between these embodiments are described.

Figure 4:
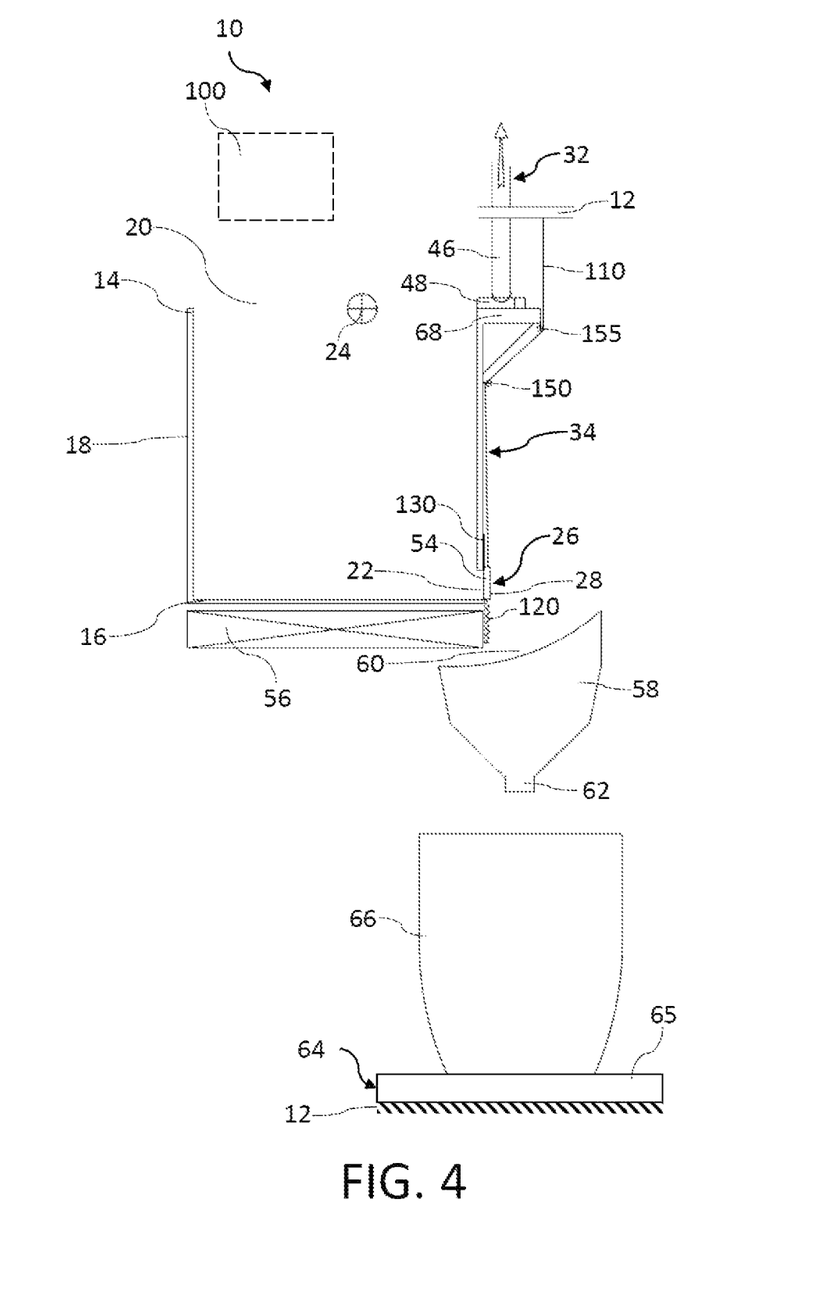
FIG. 4 is a schematic and partly cut side view illustrating a coffee machine in a coffee preparation position according to another embodiment of the invention.

According to the embodiment of FIG. 4, the closure element 28 of the valve mechanism 26 is mounted to the pot 14 so as to be movable relative to the pot 14 along the side wall 18 between the closed position (see FIG. 4) and the opened position (not shown).

The operating mechanism 34 comprises a cable pull (e.g. cable connection) 110, a closure spring 120 and a guiding member 130, which guiding member 130 guides the closure element 28 formed by the plug 54 along the side wall 18 upwards and downwards with respect to the bottom wall 16.

The plug 54 is, e.g., with an upper end of it, connected to the machine frame 12 via the cable pull 110 in a manner so that, when the pot 14 is pivoted from the coffee preparation position to the coffee distribution position, the plug 54 and, thus, the closure element 28 is held by the cable pull 110, and thereby moved relative to the pot 14 from the closed position to the opened position. Additionally, the plug 54 is, e.g., with a lower end of it, connected to (e.g., an upper end of) the closure spring 120 in a manner so as to be biased towards the closed position.

The operating mechanism 34 further includes a roller 150 fixed to the pot 14 and a roller 155 fixed to the protrusion 68 so as to guide the cable pull 110 along the side wall 18.

In the following, a coffee machine 10 according to another embodiment is described based on FIG. 5. The embodiment of FIG. 5 comprises many features of the embodiments of FIGS. 1 and 2, so that, in the following merely the differences between these embodiments are described.

Figure 5:
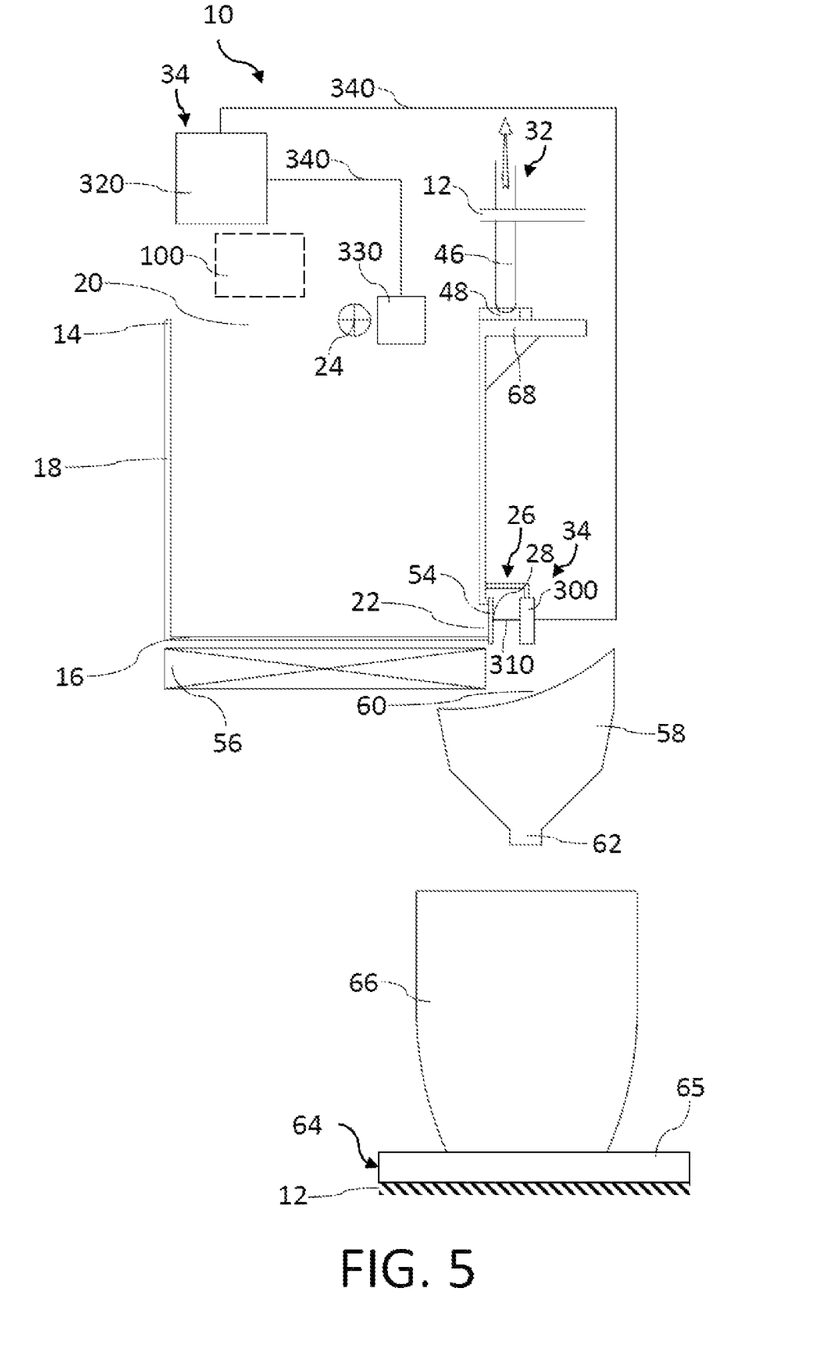
FIG. 5 is a schematic and partly cut side view illustrating a coffee machine in a coffee preparation position according to another embodiment of the invention.

In the embodiment of FIG. 5, the operating mechanism 34 includes an electric motor 300, and the closure element 28 includes a rod element 310, which is coupled to the electric motor 300 so as to be axially moveable by the electric motor 300 back and forth, and which is coupled to the plug 54, so as to correspondingly move the plug 54 back and forth. Thereby, the closure element 28 can be moved (back and forth) between the closed position (see FIG. 5) and the opened position (not shown).

The operating mechanism 34 further comprises a controller 320 and a sensor 330 which, according to this embodiment, are mounted to the machine frame 20. The sensor 330 and the controller 320 may also be mounted to the pot 14 or any other part of the coffee machine 10. The sensor 330 is capable of detecting the pivoting position of the pot 14, e.g., the pivoting of the pot in regards to the horizontal plane, and of outputting signals related to this pivoting position.

The controller 320 is respectively connected to the electric motor 310 and to the sensor 330 by a respective connection 340 which can be a wired connection or any other kind of (data) connection. The controller 320 receives the signals from the sensor 330 and controls the electric motor 310 according to these signals. In other words, the controller 320 and, thus, the operating mechanism 34 are capable of operating the valve mechanism 26.

If it is determined that the pivoting position corresponds to the coffee preparation position, the controller 320 controls the electric motor 310 so as to move the closure element 28 to the closed position. If it is determined that the pivoting position corresponds to the coffee distribution position, the controller 320 controls the electric motor 310 so as to move the closure element 28 to the opened position.

In the following, a coffee machine 10 according to another embodiment is described based on FIG. 6. The embodiment of FIG. 6 comprises many features of the embodiment of FIG. 5, so that, in the following merely the differences between these embodiments are described.

Figure 6:
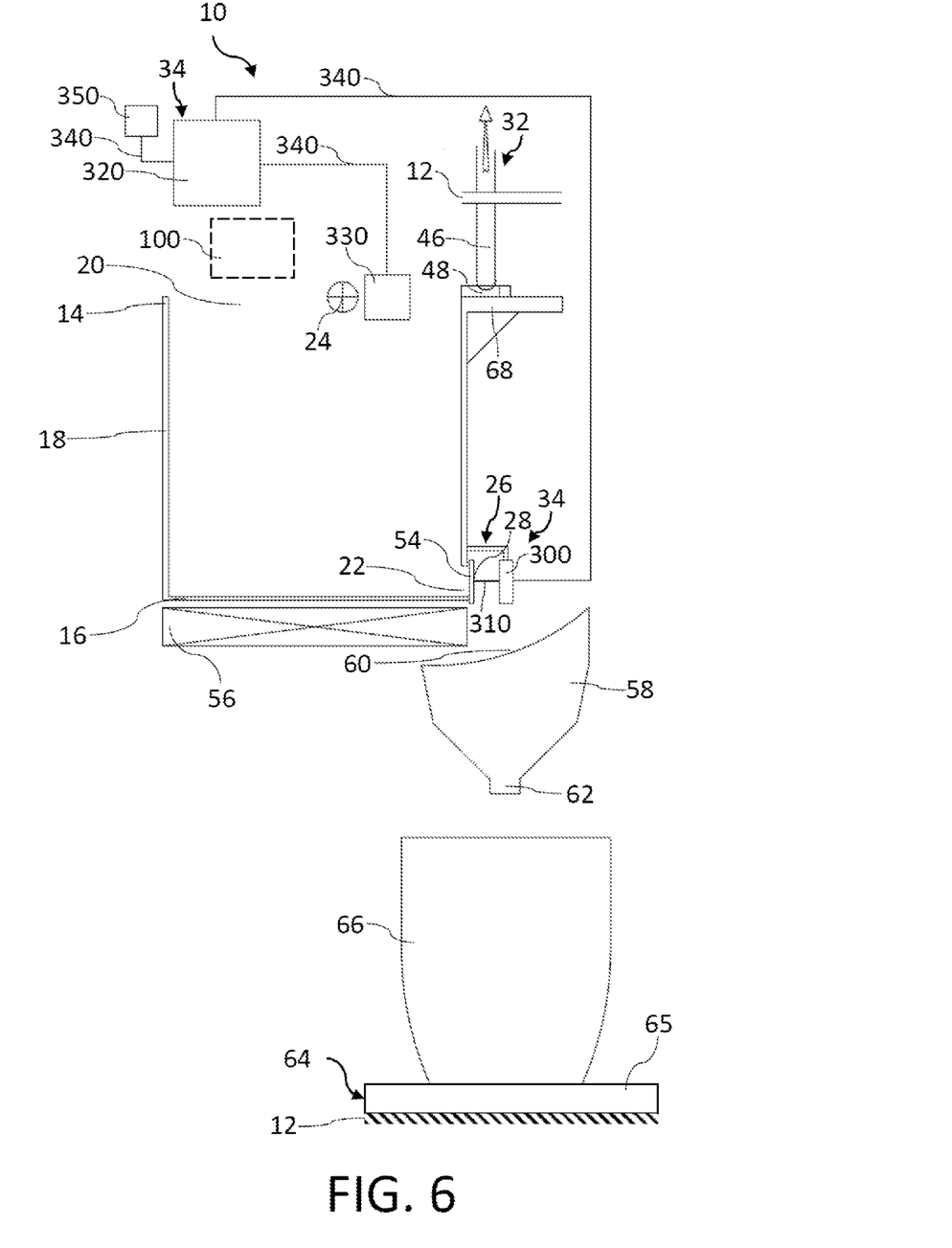
FIG. 6 is a schematic and partly cut side view illustrating a coffee machine in a coffee preparation position according to another embodiment of the invention.

In the embodiment of FIG. 6, the operating mechanism 34 further includes a user interface 350. The controller 320 is further connected via a further respective connection 340 to the user interface 350. The user interface 350 can be formed by a switch (e.g. a mechanical switch) or any other device allowing to receive inputs of a user (e.g. a plurality of (mechanical) switches, a touchscreen device).

By operation of the user interface 350, the operating mechanism 34 may be operated. The user interface 350 may, e.g., allow a user to program the controller 320. The controller 320 may, e.g., be programmed to execute preselected steps based (e.g. depending) on the position of the pot 14.

The controller 320 may, e.g., be programmed for automatically dispensing two portions of coffee. In particular, the controller 320 can be programmed, once the pot 14 has been detected to have been pivoted to the coffee distribution position, to control the electric motor 310 so as to move the closure element 28 from the closed position to the opened position, to then control the electric motor 310 so as to leave the closure element 28 in the opened position for a preselected time period, to then control the electric motor 310 so as to move the closure element 28 to the closed position, to then control the electric motor 310 so as to leave the closure element 28 in the closed position for a preselected time period, to then control the electric motor 310 so as to move the closure element 28 to the opened position again, to then control the electric motor 310 so as to leave the closure element 28 in the opened position for a preselected time period, and to then control the electric motor 310 so as to move the closure element 28 to the closed position again. This allows a plurality of cups of coffee, e.g. two or more cups of coffee, to be filled without spilling coffee while changing the cups (between filling respective cups).

In the following, a coffee machine 10 according to another embodiment is described based on FIG. 7. The embodiment of FIG. 7 comprises many features of the embodiments of FIG. 5 and FIG. 6, so that, in the following merely the differences between these embodiments are described.

Figure 7:
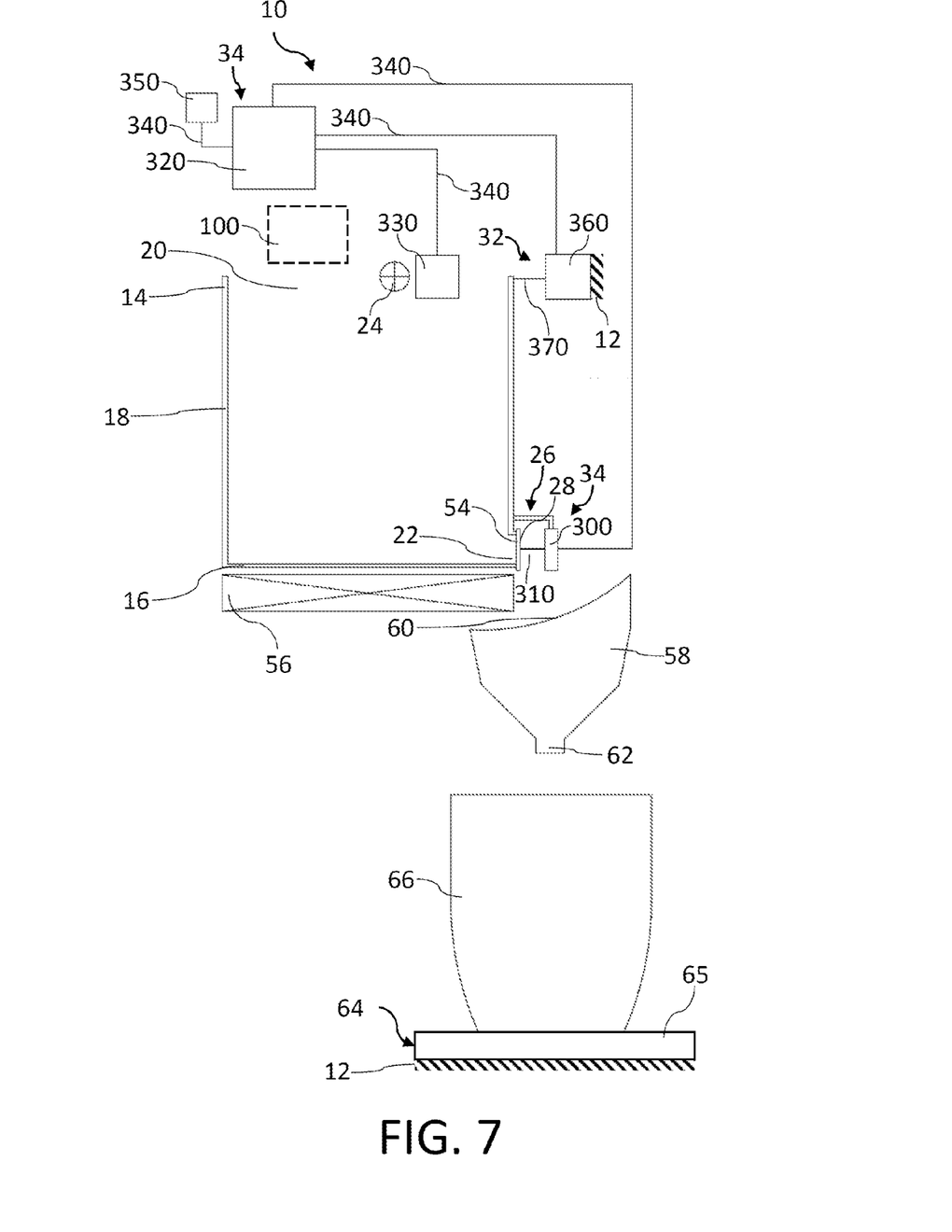
FIG. 7 is a schematic and partly cut side view illustrating a coffee machine in a coffee preparation position according to another embodiment of the invention.

In the embodiment of FIG. 7, the pivot device 32 comprises an actuator 360 and a mechanical coupling 370.

The controller 320 is further connected via a further respective connection 340 to the actuator 360. The actuator is coupled to the pot 14 via the mechanical coupling 370, and the mechanical coupling 370 can be any kind of coupling being capable of causing the pivoting motion of the pot 14 between the coffee preparation position and the coffee distribution position.

The controller 320 may, e.g., be programmed to operate the actuator 360. The controller 320 can, e.g., be programmed to operate the actuator 360 based on a user input received at the user interface 350. Further, the controller 320 may, e.g., be programmed to operate the actuator 360 so as to move the pot 14 between the coffee preparation position and the coffee distribution position.

Further, the controller 320 may, e.g., be programmed to execute an automated coffee dispensing routine. The automated coffee dispensing routine may include operating the actuator 360 so as to move the pot 14 from the coffee preparation position to the coffee distribution position, controlling the electric motor 310 so as to move the closure element 28 from the closed position to the opened position, controlling the electric motor 310 so as to leave the closure element 28 in the opened position for a preselected time, controlling the electric motor 310 so as to move the closure element 28 from the opened position to the closed position, and operating the actuator 360 so as to move the pot 14 from the coffee distribution position to the coffee preparation position.

In the following, a coffee machine 10 according to another embodiment is described based on FIG. 8. The embodiment of FIG. 8 comprises many features of the embodiments of FIGS. 1 and 2, so that, in the following merely the differences between these embodiments are described.

Figure 8:
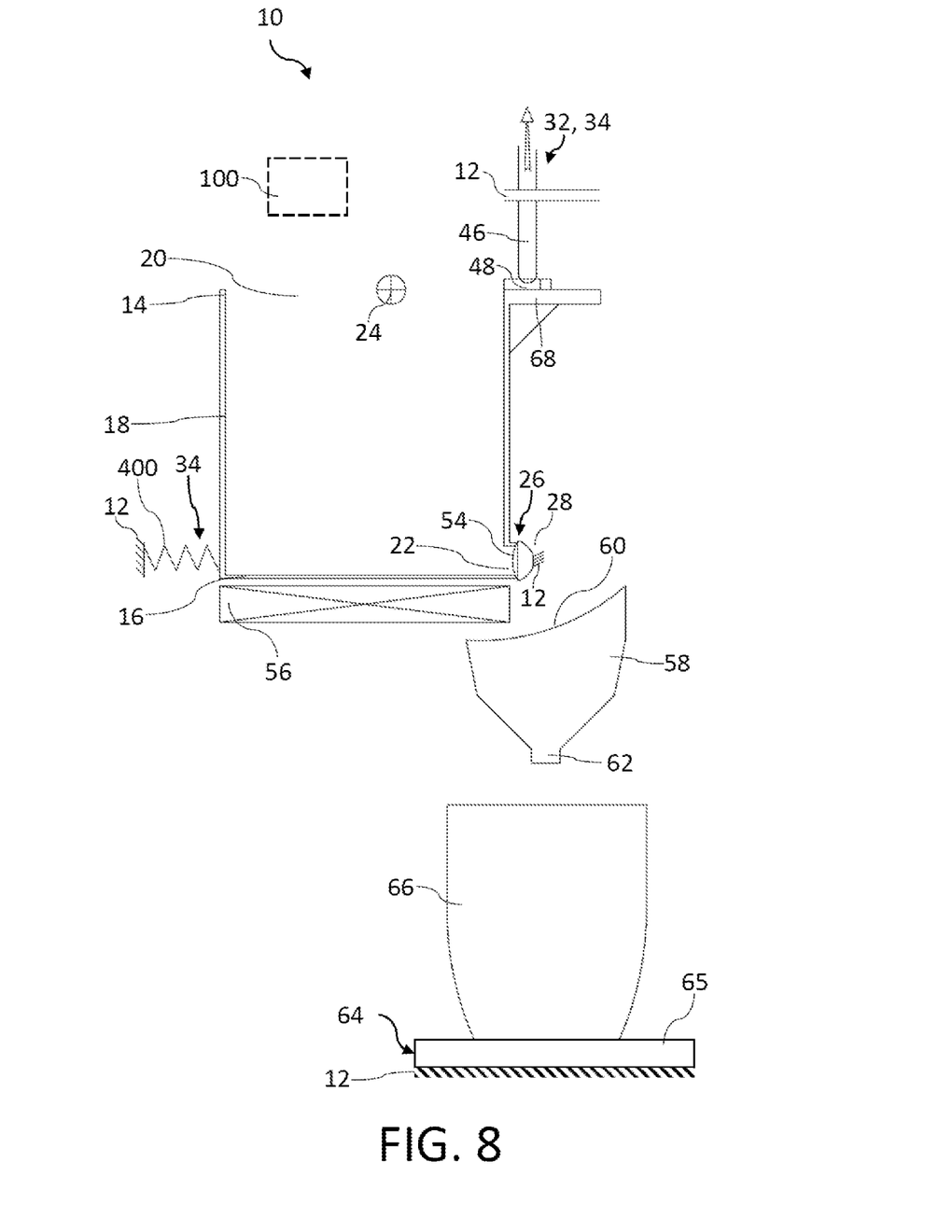
FIG. 8 is a schematic and partly cut side view illustrating a coffee machine in a coffee preparation position according to another embodiment of the invention.

According to the embodiment of FIG. 8, the closure element 28 of the valve mechanism 26 is mounted to the machine frame 12 so that the pot 14 is movable relative to the closure element 28 between the closed position (see FIG. 8) and the opened position (not shown). The closure element 28 is formed by the plug 54. The valve mechanism 26 is formed by the pivotable pot 14 and the closure element 28.

The operating mechanism 34 is formed by the pivot device 32 and further comprises a closure spring 400, wherein, when the pot 14 is pivoted from the coffee preparation position to the coffee distribution position, the operating mechanism 34 operates the valve mechanism 26 by the pivoting of the pot 14 away from the closure element 28, and, when the pot 14 is pivoted from the coffee distribution position to the coffee preparation position, the operating mechanism 34 operates the valve mechanism 26 by the pivoting of the pot 14 towards the closure element 28.

The closure spring 400 is an compression spring which is compressed when the pot 14 is pivoted from the coffee preparation position to the coffee distribution position, wherein the compression spring is supported, on the one hand, against the pot 14 and, on the other hand, against the machine frame 12 so that a corresponding spring force acts on the pot 14 and acts on the machine frame 12. In other words, the closure spring 400 biases the pot 14 to assume its coffee preparation position.

Referring to FIGS. 1-6, in every described embodiment of the coffee machine 10, the coffee machine 10 further includes an electrical heating device 56 which is arranged on the bottom wall 16 on an outside thereof, wherein the heating device 56 is fixedly attached to the pot 14 so as to be moved in connection with the pivoting of the pot 14.

Further, in every described embodiment of the coffee machine 10, the bottom wall 16 has a plate shape, in the described embodiments a flat plate shape, and extends horizontally when the pot 14 is in the coffee preparation position and is inclined relative to the horizontal plane when the pot 14 is in the coffee distribution position.

Further, in every described embodiment of the coffee machine 10, the coffee machine 10 further comprises a funnel 58 which is fixedly attached to the machine frame 12 and which has a funnel inlet 60 arranged proximal to the outlet opening 22 such as to receive prepared coffee via the outlet opening 22 (e.g., illustrated by an arrow between the outlet opening 22 and the funnel inlet 60 in FIG. 2) when the pot 14 is in the coffee distribution position, and a funnel outlet 62 arranged below the funnel inlet 60, wherein, optionally, the coffee machine 10 further comprises a cup positioning station 64 in form of a platform 65, which is fixedly attached to the machine frame 12 and which is located in a vertical distance below the funnel outlet 62 and on which a cup 66 can be positioned to receive the coffee dispensed via the funnel outlet 62 (e.g., illustrated by an arrow at the funnel outlet 62 in FIG. 2).

Further, in every described embodiment, the pivot axis 24 is located in the proximity of the upper portion of the pot 14 and below an upper edge of the side of the pot 14.

Further, the coffee machine 10 may further include a coffee powder supply device 100 which is arranged vertically above the pot 14 and by which coffee powder can be automatically supplied, e.g., via gravity, into the pot 14 via its inlet opening 20.

Alternatively, the coffee machine 10 may not be provided with such a coffee powder supply device 100, but coffee powder may just be manually supplied into the pot 14 via the inlet opening 20 by a user.

What is claimed is:

1. A coffee machine (10) comprising:
   a machine frame (12);
   a pot (14) which has a bottom wall (16), a circumferential side wall (18), an inlet opening (20) provided in an upper portion of the pot (14), and an outlet opening (22) provided in a lower and outer portion of the pot (14), wherein the pot (14) is mounted to the machine frame (12) in a manner so as to be pivotable relative to the machine frame (12) about a horizontal pivot axis (24) between a coffee preparation position and a coffee distribution position, in which the outlet opening (22) is positioned at a lower vertical level than in the coffee preparation position;
   a valve mechanism (26) including a closure element (28), wherein the closure element (28) and the pot (14) are movable relative to each other between a closed position, in which the closure element (28) closes the outlet opening (22), and an opened position, in which the closure element (28) releases the outlet opening (22);
   a pivot device (32) which is connected to the pot (14) and by operation of which the pot (14) can be caused to pivot between the coffee preparation and coffee distribution positions thereof; and
   an operating mechanism (34) which is configured to operate the valve mechanism (26) to move the pot (14) and the closure element (28) relative to each other between the closed position and the opened position;
   wherein the operating mechanism (34) is a moving mechanism that simultaneously operates the valve mechanism (26) to move the pot (14) and the closure element (28) relative to each other between the closed position and the opened position;
   wherein the closure element (28) moves from the closed position to the open position when the pot (14) pivots from the coffee preparation position to the coffee distribution position; and wherein the closure element (28) moves from the opened position to the closed position when the pot (14) pivots from the coffee distribution position to the coffee preparation position.

2. The coffee machine (10) according to claim 1, wherein the operating mechanism (34) is configured in a manner so that, when the pot (14) is being pivoted from the coffee preparation position to the coffee distribution position, the operating mechanism (34) simultaneously operates the valve mechanism (26) to move the pot (14) and the closure element (28) relative to each other from the closed position to the opened position, and, when the pot (14) is being pivoted from the coffee distribution position to the coffee preparation position, the operating mechanism (34) simultaneously operates the valve mechanism (26) to move the pot (14) and the closure element (28) relative to each other from the opened position to the closed position.

3. The coffee machine (10) according to claim 1, wherein the operating mechanism (34) is configured in a manner so that, when the pot (14) is in the coffee distribution position, the operating mechanism (34) can operate the valve mechanism (26) to move the pot (14) and the closure element (28) relative to each other between the closed position and the opened position.

4. The coffee machine (10) according to claim 1,
wherein the closure element (28) is mounted to the pot (14) so as to be movable relative to the pot (14) between the closed position, in which the closure element (28) closes the outlet opening (22), and the opened position, in which the closure element (28) releases the outlet opening (22).

5. The coffee machine (10) according to claim 4,
wherein the closure element (28) is mounted to the pot (14) so as to be rotatable relative to the pot (14) about a rotation axis (30) between the closed position, in which the closure element (28) closes the outlet opening (22), and the opened position, in which the closure element (28) releases the outlet opening (22);
wherein the rotation axis (30) is fixedly arranged relative to the pot (14) so as to be moved relative to the machine frame (12) together with the pivoting motion of the pot (14);
wherein the moving mechanism is a rotation mechanism which includes a linkage (36) which is linked to the closure element (28) via a first joint (38) and which is linked to the machine frame (12) via a second joint (39) so that, when the pot (14) is pivoted from the coffee preparation position to the coffee distribution position, the distance between the rotation axis (30) and the second joint (39) increases whereby the linkage (36) causes the closure element (28) to rotate from the closed position to the opened position, and, when the pot (14) is pivoted from the coffee distribution position to the coffee preparation position, the distance between the rotation axis (30) and the second joint (39) decreases whereby the linkage (36) causes the closure element (28) to correspondingly rotate from the opened position to the closed position.

6. The coffee machine (10) according to claim 5, wherein the linkage (36) comprises a first link arm (40) linked on one end portion thereof to the machine frame (12) via the second joint (39), and a second link arm (41) linked on end portion thereof to the closure element (28) via the first joint (38), wherein the first and second link arms (40, 41) are linked to each other on their other end portions via a third joint (42).

7. The coffee machine (10) according to claim 2, wherein the pivot device (32) comprises an elastic element (44), optionally a coil spring, which acts against the pot (14) so as to bias the pot (14) to assume its coffee preparation position.

8. The coffee machine (10) according to claim 7, wherein the elastic element (44) is a compression spring (44) which is compressed when the pot (14) is pivoted from the coffee preparation position to the coffee distribution position, wherein the compression spring (44) is supported, on the one hand, against the pot (14) and, on the other hand, against the linkage (36), optionally against the first link arm (40), so that a corresponding elastic force acts on the pot (14) and acts on the linkage (36), optionally on the first link arm (40), via which linkage (36), optionally via which first link arm (40), the corresponding counter-force of said compression force is transferred to the machine frame (12) via the second joint (39).

9. The coffee machine (10) according to claim 2, wherein the pivot device (32) comprises a pushing element (46) which is movably installed to the machine frame (12) and which can be operated to push against a push receiving portion (48) of the pot (14), which push receiving portion (48), when seen in a top view of the pot, is offset from the pivot axis (24) in a direction towards the outlet opening (22), wherein, optionally, the pushing element (46) is a pushing rod which can be pushed, with a rod end thereof, against the push receiving portion (48).

10. The coffee machine (10) according to claim 6, wherein the closure element (28) comprises an elbow element (50) having a first leg (51) and a second leg (52) which are connected to each other on a base portion (53) of the elbow element (50), and a plug (54) attached to the first leg (51), optionally to a free end portion of the first leg (51), wherein the first joint (38) is connected to the second leg (52), optionally to a free end portion of the second leg (52), and wherein, further optionally, the rotation axis (30) is located adjacent to or in the base portion (53).

11. The coffee machine (10) according to claim 1, wherein the bottom wall (16) has a plate shape, optionally a flat plate shape, and extends horizontally when the pot (14) is in the coffee preparation position and is inclined relative to the horizontal plane when the pot is in the coffee distribution position.

12. The coffee machine (10) according to claim 1, further including an electrical heating device (56) which is arranged on the bottom wall (16) on an outside thereof, wherein the heating device (56) is fixedly attached to the pot (14) so as to be moved in connection with the pivoting of the pot (14).

13. The coffee machine (10) according to claim 1, further comprising a funnel (58) which is fixedly attached to the machine frame (12) and which has a funnel inlet (60) arranged proximal to the outlet opening (22) such as to receive prepared coffee via the outlet opening (22) when the pot (14) is in the coffee distribution position, and a funnel outlet (62) arranged below the funnel inlet (60), wherein, optionally, the coffee machine (10) further comprises a cup positioning station (64) which is located in a vertical distance below the funnel outlet (62) and on which a cup (66) can be positioned to receive the coffee dispensed via the funnel outlet (62).

14. The coffee machine (10) according to claim 1, further comprising a coffee powder supply device (100) connected to the inlet opening (20) of the pot (14) and configured to supply coffee powder into the pot (14) via the inlet opening (20).

15. The coffee machine (10) according to claim 1 provided that in combination with claim 9, wherein the push receiving portion (48) is formed by a protrusion (68) which is formed on an upper portion of the side wall (18) of the pot (14) and which laterally protrudes away from the side wall (18).

16. The coffee machine (10) according to claim 14 provided that in combination with claim 8, wherein the protrusion (68) has a through hole (70), through which the linkage (36), optionally the first link arm (40), extends, wherein the linkage (36), optionally the first link arm (40), is provided with an axial shoulder (72) which is arranged opposite to the protrusion (68) and in a distance from the protrusion (68) in a direction away from the second joint (39) and which faces the protrusion (68), wherein the elastic element (44) is arranged between and supported by the protrusion (68) and the axial shoulder (72) to thereby transfer the elastic force to the pot (14) via the protrusion (68) and to the linkage (36), optionally to the first link arm (40), via the axial shoulder (72).

17. The coffee machine (10) according to claim 10, wherein in the coffee preparation position, the second leg (52) and the second link arm (41), on one side thereof, together enclose an angle (a) in a range of 80-90°, optionally 85-90°, further optionally of at least substantially 90°.

18. The coffee machine (10) according to claim 1, wherein the pivot axis (24) is located in the proximity of the upper portion of the pot (14), optionally in the proximity of the upper portion of the pot (14) and below an upper edge of the side wall (18) of the pot (14).

19. The coffee machine (10) according to claim 1, wherein the valve mechanism (26) is located outside of the pot (14), wherein the valve mechanism (26) is optionally mounted to an outer portion of the pot (14).

20. A coffee machine (10) comprising:
- a machine frame (12);
- a pot (14) which has a bottom wall (16), a circumferential side wall (18), an inlet opening (20) provided in an upper portion of the pot (14), and an outlet opening (22) provided in a lower and outer portion of the pot (14), wherein the pot (14) is mounted to the machine frame (12) in a manner so as to be pivotable relative to the machine frame (12) about a horizontal pivot axis (24) between a coffee preparation position and a coffee distribution position, in which the outlet opening (22) is positioned at a lower vertical level than in the coffee preparation position;
- a valve mechanism (26) including a closure element (28), wherein the closure element (28) and the pot (14) are movable relative to each other between a closed position, in which the closure element (28) closes the outlet opening (22), and an opened position, in which the closure element (28) releases the outlet opening (22);
- a pivot device (32) which is connected to the pot (14) and by operation of which the pot (14) can be caused to pivot between the coffee preparation and coffee distribution positions thereof; and
- an operating mechanism (34) which is configured to operate the valve mechanism (26) to move the pot (14) and the closure element (28) relative to each other between the closed position and the opened position;
- wherein the operating mechanism (34) is configured in a manner so that, when the pot (14) is being pivoted from the coffee preparation position to the coffee distribution position, the operating mechanism (34) simultaneously operates the valve mechanism (26) to move the pot (14) and the closure element (28) relative to each other from the closed position to the opened position, and, when the pot (14) is being pivoted from the coffee distribution position to the coffee preparation position, the operating mechanism (34) simultaneously operates the valve mechanism (26) to move the pot (14) and the closure element (28) relative to each other from the opened position to the closed position;
- wherein the closure element (28) is mounted to the pot (14) so as to be movable relative to the pot (14) between the closed position, in which the closure element (28) closes the outlet opening (22), and the opened position, in which the closure element (28) releases the outlet opening (22); and
- wherein the operating mechanism (34) is a moving mechanism which is connected to the closure element (28) so as to move the closure element (28), when the pot (14) is pivoted from the coffee preparation position to the coffee distribution position, from the closed position to the opened position, and, when the pot (14) is pivoted from the coffee distribution position to the coffee preparation position, from the opened position to the closed position.

* * * * *